March 28, 1961 A. F. VERDESCA 2,976,903
TIRE ATTACHMENTS
Filed Feb. 17, 1959 2 Sheets-Sheet 1
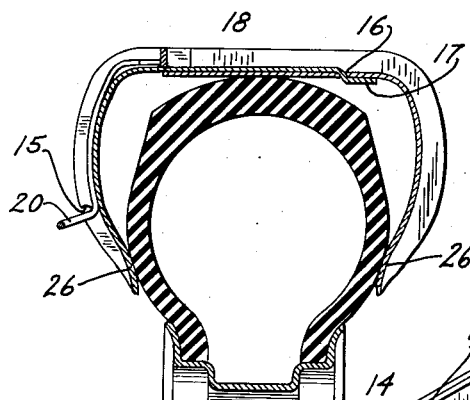
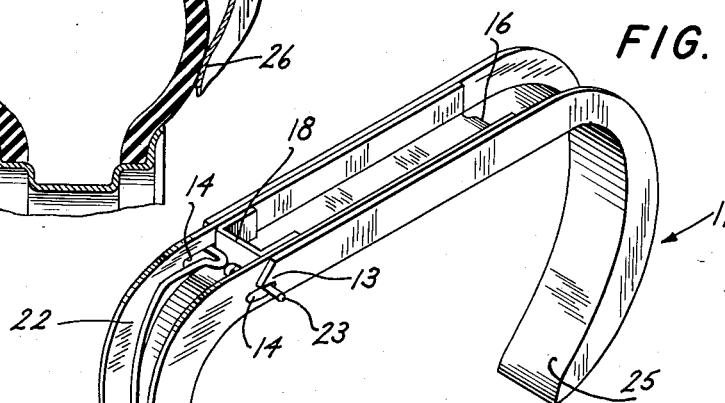
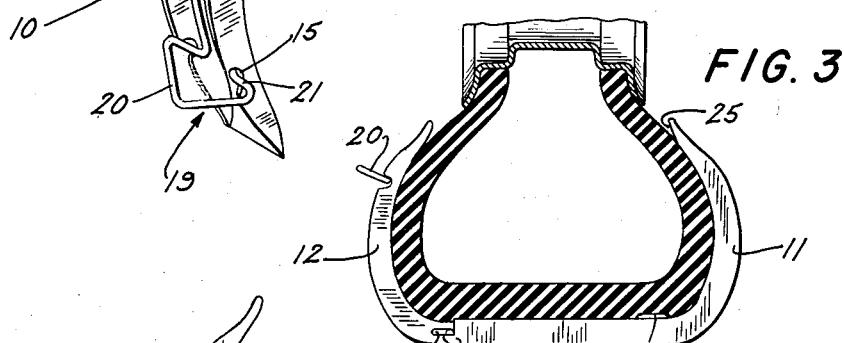
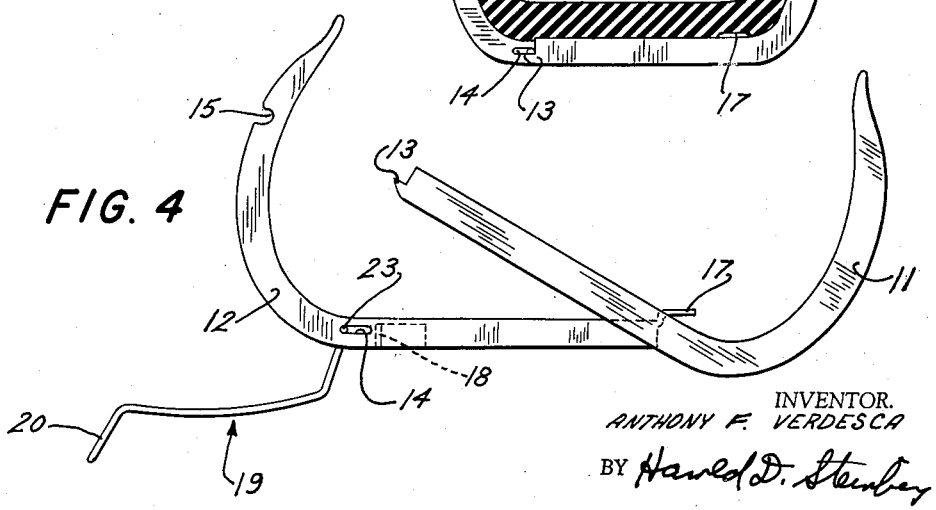
INVENTOR.
ANTHONY F. VERDESCA
BY Harold D. Steinberg
ATTORNEY

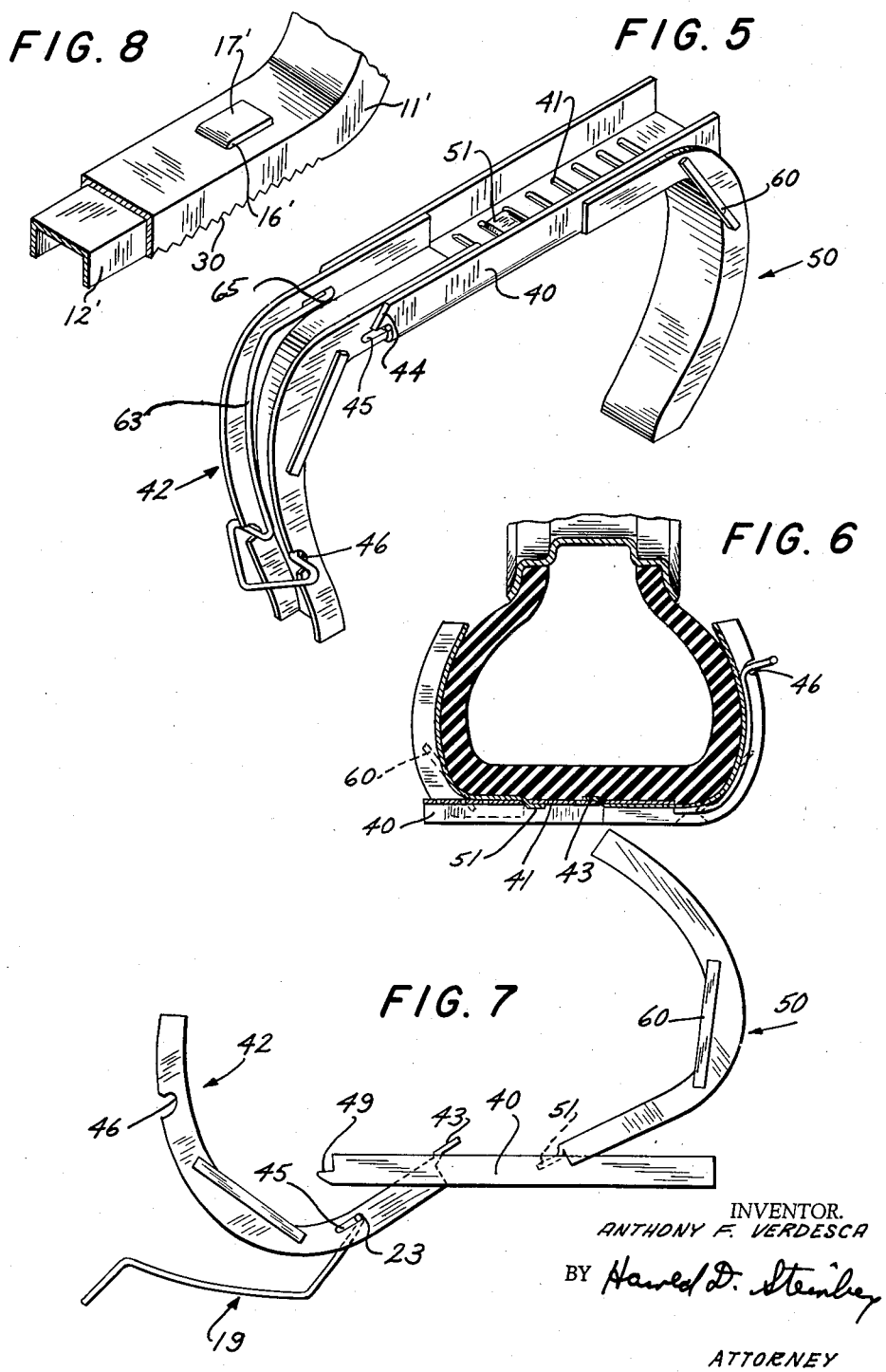

United States Patent Office 2,976,903
Patented Mar. 28, 1961

2,976,903

TIRE ATTACHMENTS

Anthony F. Verdesca, Fairview, N.J., assignor to Ver-Sa-Parts Mfg. Corp., Fairview, N.J.

Filed Feb. 17, 1959, Ser. No. 793,871

4 Claims. (Cl. 152—228)

The present invention relates to tire attachments.

More particularly, the present invention relates to attachments to be used with the tires of vehicles such as automobiles or the like for providing greater traction where conditions are such that the tire might otherwise slip. For example, when traveling on ice or snow conventional tires do not always give the desired traction, and the attachment of the present invention provides the additional traction which is required at such a time.

Of course, chains are a well known solution to this problem. However the conventional chains which are attached to tires to give the added traction have several disadvantages. Thus, they are extremely difficult to mount on and remove from the tire, particularly in snow or mud when they are most needed. Also, they have a considerable weight and are extremely difficult to move around and take up a considerable amount of space when not in use which is also undesirable. Furthermore such conventional chains on the one hand are fairly expensive and on the other hand do not always provide the desired results.

One of the objects of the present invention is to overcome the above drawbacks by providing a tire attachment which can be very easily and quickly mounted on and removed from a tire.

Another object of the present invention is to provide a tire attachment of the above type which is of extremely simple and inexpensive construction.

It is also an object of the present invention to provide a tire attachment of the above type which is relatively small and occupies only a small amount of space when not in use.

An additional object of the present invention is to provide a tire attachment of the above type which will efficiently cooperate with a tire particularly at the part thereof which is in engagement with the ground.

It is also an object of the present invention to provide a tire attachment of the above type which can readily be used with tires of different sizes.

With the above objects in view the present invention includes in a tire attachment of the above type a substantially U-shaped assembly composed of a pair of substantially L-shaped members which are connected together for movement with respect to each other and a manually releasable means cooperating with these members for releasably holding them together in the position where they form the substantially U-shaped assembly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a perspective view of one embodiment of a tire attachment according to the present invention;

Fig. 2 is a longitudinal sectional illustration of the attachment of Fig. 1 showing the same on a tire at a part of the latter which is not in engagement with the ground;

Fig. 3 shows the attachment of Fig. 2 in an elevational view at that part of a tire which is in engagement with the ground, the tire itself being shown in section in Fig. 3;

Fig. 4 is an elevational view ilustrating the manner in which the components of the attachment are capable of being assembled and disassembled so as to be capable of being placed on and removed from a tire;

Fig. 5 is a perspective view of another embodiment of an attachment according to the present invention;

Fig. 6 shows the attachment of Fig. 5 on a tire at the part of the latter which is in engagement with the ground;

Fig. 7 illustrates the manner in which the attachment of Fig. 5 can be placed on and removed from a tire; and Fig. 8 is a fragmentary perspective illustration of still another embodiment of an attachment according to the present invention.

Referring now to Fig. 1, it will be seen that the attachment 10 illustrated therein has a substantially U-shaped configuration when its components are assembled. These components include a pair of substantially L-shaped members 11 and 12, and as is indicated in Fig. 1 each of these members is of a channel shaped configuration and has a pair of side walls and a transverse wall interconnecting the side walls. As is shown in Fig. 1 the side walls of the member 11 are spaced from each other by a distance slightly greater than the side walls of the member 12 so that the straight leg of the latter nests in and extends along the interior of the straight leg of the member 11. As is evident from Fig. 1 the members 11 and 12 each have a straight leg and a curved leg extending from an end of the straight leg. The members 11 and 12 are made of a rigid strong metal such as steel, for example. The member 11 is provided at the end of its straight leg with a pair of substantially hook-shaped projections 13, and it will be seen that the side walls of the member 12 are formed with slots 14, respectively, adjacent the hook-shaped projections 13. Furthermore, the side walls of the member 12 are formed adjacent the outer free end of the curved leg of the latter with a pair of notches 15 as indicated in Figs. 1-4. The transverse wall of the member 11, which interconnects the side walls of the latter is formed with a slot 16 (Fig. 2), this slot also being indicated partly in Fig. 1, and the member 12 terminates in a tongue 17 which extends freely through this slot. Thus, as may be seen from Fig. 4 the extension of the tongue 17 through the slot 16 enables the members 11 and 12 to turn with respect to each other between the position of Fig. 1 and that of Fig. 4 as well as beyond that of Fig. 4 to any desired position, and the parts can of course be easily separated by removing the tongue 17 from the slot 16. The member 12 is provided with a member 18 extending between and connected to the side walls thereof as shown in Fig. 1. This member 18 acts as a reinforcement member and also to help cam the heavy wire spring member 19 (discussed below) out of the slots 14 when the spring is released for removal of the entire assembly from the tire.

A heavy wire spring member 19 has the configuration shown most clearly in Fig. 1. This spring 19 is provided with the substantially V-shaped portion 20 which can be grasped by the operator, and from the V-shaped portion the wire 19 has portions 21 which extend through the notches 15, respectively, and then the wire 19 extends from the portion 21 with elongated curved portions 22 along the interior of the member 12 toward the slots 14 thereof, these portions 22 being curved as indicated in Fig. 1. At the end of the portions 22 distant from the portions 21 the wire 19 has portions 23 which are substantially straight and extend through the slots 14 as indicated in Fig. 1. It will be noted that the portions 23 abut against each other in the assembly. This is to prevent the releasing of the spring by an accidental force against the portions 23. The same effect can also be achieved by inserting a wedge member between the portions 22 of the wire. With the wire having its end portions 23 extending through the slots 14 and with the portions 21 thereof extending through the notches 15, the member 11 can be turned in a counterclockwise direction, as viewed in Fig. 4 to a position where it will have with respect to the member 12 the relation indicated in Fig. 1. Just before the member 11 reaches this position the hook-shaped projections 13 will ride over the end portions 23 of the spring 19 and the latter will then snap against the hook-shaped portions 13 in the manner indicated in Fig. 1 to reliably hold the parts together and prevent their disassembly. Thus, with the parts having the position indicated in Fig. 4 the operator need only place the portions 21 of the spring 19 into the notches 15, and this will result in a pushing of the end portions 23 of the spring 19 against the right end of the slots 14, as viewed in Fig. 4. Now the operator can place the assembly on a tire and the tire in pressing the assembly against the ground will cause the hook portions 13 to snap past the free end portions 23 of the spring so as to lock the assembly on the tire. If desired the assembly can simply be placed on the ground in front or back of the tire and then the tire can be driven over the assembly so that it will automatically snap onto the tire. In this simple way it is possible to quickly mount the assembly on the tire, and when it is desired to remove the assembly from the tire it is only necessary for the operator to grasp the portion 20 of the spring 19 and remove the portions 21 thereof from the notches 15 so that the portions 23 of the spring will release the hook portions 13 and thus enable the assembly to be quickly removed from a tire. It will be noted from Fig. 1 that the slots 14 extend to the left, as viewed in Fig. 1, beyond the hook portions 13 so that the spring when released easily moves away from the hook portions 13 to enable the structure to be removed from a tire.

It will be noted that the members 11 and 12 are each provided adjacent their outer free ends of their curved legs with convexly curved faces 25 directed toward each other, these faces 25 forming surfaces of portions 26 shown in Fig. 2. As a result of these convexly curved surfaces 25 which are in direct engagement with the exterior surfaces of the side walls of the tire, the device of the invention will not grip the tire in a manner which will cause the device to dig into and damage the tire walls. The device will reliably grip the tire so as to remain securely thereon but will not damage the tire.

Also, as may be seen from a comparison of Figs. 2 and 3, the configuration of the device of the invention is carefully designed so that it will match the cross section of that portion of the tire which is at the lowest part of the tire next to the ground, as may be seen from Fig. 3. Therefore, the device of the invention is in engagement along substantially its entire length with the exterior surface of the tire at the moment when the device of the invention is in engagement with the ground so as to provide the best possible cooperation between the tire and the device of the invention at the instant when the device of the invention gives the desired additional traction.

The additional traction is derived from the free edges of the side walls of the channel shaped members 11 and 12, these free edges directly engaging and digging into ice or snow, for example. Of course, the device of the invention also is useful in mud, for example, or sand.

If it is desired to increase the traction then an embodiment as illustrated fragmentarily in Fig. 8 may be used. In this embodiment the parts are substantially identical with that of the embodiment of Figs. 1-4 except for the difference noted below. Thus, the member 12′ corresponds to the member 12 and includes a tongue 17′ extending through a slot 16′ of the member 11′ which corresponds to the member 11, and the parts are releasably held together by a spring substantially identical with the spring 19. This spring 63, instead of having free ends which abut against each other, have spaced free ends between which the spacer member or wedge member 65 is fixed to prevent movement of the free ends of the spring towards each other. The main difference between the embodiment of Fig. 8 and that of Figs. 1-4 is that the side walls of the straight, nested legs of the members 11′ and 12′ are serrated so as to have the teeth 30 which will provide sharp points, or relatively sharp points, which will dig into the snow or ice to provide added traction. If desired only the side walls of the element 11′ may be serrated at the edges thereof which engage the ground, and in this case these side walls would extend slightly beyond the side walls of the member 12′. However it is also possible for the side walls of the latter to be serrated at their free edges which engage the ground. Also, a serrated block, for example of hard rubber may be fixed to the channel 12′ between the side walls thereof and provided with ground-engaging teeth.

It is possible to apply the attachment of Figs. 1-4 to tires of different sizes, the attachment gripping the larger tires with a greater force when the parts are in the position indicated in Fig. 2. Thus, the embodiment of Figs. 1-4 is not limited to one tire of a given size. However, where it is desired to have an attachment which may be applied to tires of considerable difference in size, the embodiment of Figs. 5-7 may be used. Thus, with the embodiment of Figs. 5-7 it is possible for the manufacturer to stock only this one embodiment for all sizes of tires throughout the entire range of tire sizes whereas with the embodiment of Figs. 1-4 each attachment could be used with tire sizes in a smaller range, so that it might be necessary to stock attachments of different sizes with the embodiment of Figs. 1-4. Referring now to Figs. 5-7, it will be seen that the attachment illustrated thereing includes an elongated straight channel member 40 provided with a plurality of slots 41 corresponding to the slots 17 described above. A substantially L-shaped member 42 which corresponds to the member 12 is provided with a tongue 43 which is selectively placed in one of the slots 41, and the slot is chosen so that the substantially hook shaped projections 44 at the end of member 40 will cooperate properly with the ends 23 of the spring 19 of Figs. 5-7 the spring being identical with that of Figs. 1-4. Thus, the member 42 is provided with slots 45 and notches 46 which correspond to the slots 14 and notches 15 and operate in the same way, the ends 23 of the spring 19 cooperating with the projection 44 in the same way that this spring cooperates with the projections 13 in the embodiment of Figs. 1-4. A substantially L-shaped member 50 completes the assembly, this member 50 having a tongue 51 which can be placed in any one of the slots 41 so that the distance between the members 42 and 50 can be regulated. It will be seen that the straight leg of member 42 is received in the channel member 40 while the channel member 40 is itself received in the straight leg of the L-shaped member 50. When the spring does not hold the member 42 connected to the member 40, and the device is not on a tire the assembly may be turned to the position indicated in Fig. 7, and the components may be separated from each other. When the device is mounted on a tire, the tire itself holds the member 15 assembled with the member 40, while the spring 19 guarantees that all of the parts are connected together to provide the desired increase in traction. As indicated in Fig. 6, the embodiment of Figs. 5–7 cooperates with the tire at the lowest part theerof in the same way as the embodiment of Figs. 1–4.

Reinforcement and gripping members 60 in the form of small bars welded to the L-shaped members 42 and 50 at the intersections of the legs thereof in the manner indicated in Figs. 5 and 7 may be provided to reinforce the structure and also to help grip the tire, particularly in the position shown in Fig. 6, and such reinforcements may also be included in the embodiment of Figs. 1–4, if desired.

It is apparent that the above-described structure of the invention is extremely simple and can easily be mounted on or removed from a tire so that it is a simple matter for the user to mount the device on a tire just during the moments when it is necessary to use the same and then when smooth road which requires no additional traction is encountered, it is simple to easily and quickly remove the device. It is only necessary to attach one of the devices of the invention to a tire.

If desired, the tire attachment of the invention may be provided at its part which extends across the outer periphery of the tire with a rigid arcuate tire engaging member fixed to the tire attachment and having a curvature corresponding to that of the exterior periphery of the tire, this arcuate member extending forwardly and rearwardly beyond the rest of the attachment and having at its ends, respectively, lips which extend toward the axis of the tire so as to project into the treads to improve the security of the connection of the attachment with the tire and so as to more widely distribute the transmission of forces between the tire and the attachment of the invention.

It will be understood that each of the elements described above, or two or more together, may also find a useful application in other types of tire attachments differing from the types described above.

While the invention has been illustrated and described as embodied in tire attachments for increasing the traction of a tire, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A tire attachment comprising, in combination, a first substantially L-shaped channel member having a substantially straight leg and a curved leg connected to said straight leg, said channel member being formed in a wall of its straight leg which extends between side walls of said channel member with a transverse slot and said straight leg of said first member terminating at its side walls in a pair of substantially hook-shaped portions; a second substantially L-shaped member also having a straight leg and a curved leg, said straight leg of said second member extending into said straight leg of said first member between the side walls of the latter and terminating in a tongue which extends through said slot, the side walls of said second member respectively having a pair of slots adjacent to the hook-shaped end portions of said first member and the side walls of said second member being formed at the region of the free end of the curved leg thereof with a pair of curved notches extending inwardly from the free edges of said side walls; and an elongated wire spring having free ends respectively extending through said slots of said side walls of said second member and extending over the hook-shaped end portions of said first member to prevent the latter from being removed from said second member, said wire spring having portions located in said notches for retaining the portions which extend through said slots over the hook-shaped end portions of said first member, whereby said wire spring may be manually removed from said notches to permit movement of said wire spring along said slots for releasing said members from each other.

2. A tire attachment comprising, in combination, an elongated substantially straight channel member having a pair of side walls and a third wall interconnecting said side walls and formed with a plurality of slots extending transversely thereof; a pair of substantially L-shaped members also of channel shaped configuration respectively having at their ends a pair of tongues adapted to be selectively placed in a pair of said slots, respectively, so that said pair of L-shaped members provide with the slotted member a substantially U-shaped assembly whose length may be regulated by selectively placing said tongues in selected slots; and means cooperating with said L-shaped members and slotted member for releasably holding the same together in a position where they form a substantially U-shaped assembly.

3. A tire attachment comprising a first substantially L-shaped member terminating at one end in a tongue; a second substantially L-shaped member formed in one of its legs with a slot through which said tongue extends so that said L-shaped members are turnable one with respect to the other to a point where said one leg of said second member abuts against a leg of said first member to provide a substantially U-shaped assembly; and means co-operating with said members for releasably holding the same in a position where said legs abut against each other to form a substantially U-shaped construction including at least one hook at an end of said second member, a spring carried by said first member and engaging said hook to prevent said members from moving with respect to each other away from a position wherein they have said substantially U-shaped configuration, and manually operable means co-operating with said spring for placing the same in a position where it can be released from said hook.

4. A tire attachment comprising a first substantially L-shaped member terminating at one end in a tongue; a second substantially L-shaped member formed in one of its legs with a slot through which said tongue extends so that said L-shaped members are turnable one with respect to the other up to a point where said one leg of said second member abuts against a leg of said first member to provide the substantially U-shaped assembly, said L-shaped members having channel-shaped portions at the region where said one leg of said second member abuts said leg of said first member with said first member nesting at said abuting region in said second member, the latter having side walls forming part of its channel-shaped portion and one of which terminates in a hook; and means co-operating with said members for releasably holding the same in a position where said legs abut against each the other to form a substantially U-shaped assembly, said means including a spring having a free end extending through said slot and engaged by said hook.

References Cited in the file of this patent

UNITED STATES PATENTS

| | | |
|---|---|---|
| 1,499,036 | Smith | June 24, 1924 |
| 2,445,947 | Hoppes | July 27, 1948 |
| 2,663,345 | Cardell | Dec. 22, 1953 |
| 2,664,934 | Safran | Jan. 5, 1954 |
| 2,692,632 | Snedeker | Oct. 26, 1954 |
| 2,738,820 | Browing et al. | Mar. 20, 1956 |